US011117209B2

(12) United States Patent
Niedermayer et al.

(10) Patent No.: US 11,117,209 B2
(45) Date of Patent: Sep. 14, 2021

(54) SOLDERING TIP FASTENING DEVICE

(71) Applicant: Apex Brands, Inc., Apex, NC (US)

(72) Inventors: Bernd Niedermayer, Gemmrigheim (DE); Ralf Zerweck, Bönnigheim (DE)

(73) Assignee: APEX BRANDS, INC., Apex, NC (US)

( * ) Notice: Subject to any disclaimer, the term of this patent is extended or adjusted under 35 U.S.C. 154(b) by 235 days.

(21) Appl. No.: 15/966,067

(22) Filed: Apr. 30, 2018

(65) Prior Publication Data

US 2019/0126376 A1   May 2, 2019

(30) Foreign Application Priority Data

Oct. 27, 2017   (DE) .................... 20 2017 106517.0

(51) Int. Cl.
*B23K 3/03* (2006.01)
*B23K 3/02* (2006.01)
*B23K 3/08* (2006.01)

(52) U.S. Cl.
CPC .............. *B23K 3/0369* (2013.01); *B23K 3/02* (2013.01); *B23K 3/026* (2013.01); *B23K 3/08* (2013.01)

(58) Field of Classification Search
USPC ....... 219/229, 227, 231, 241, 230, 240, 243, 219/228, 238, 221, 233, 236, 225, 543, 219/222, 232, 497, 521, 533, 548, 553, 219/85.1, 118, 121.63, 129, 201, 226, 219/234, 237, 242, 254, 494, 501, 524, 219/535, 56, 616, 617, 85.16, 85.19, 85.2; 228/51, 55, 54, 53, 8, 52, 102, 103, 20.5, 228/33, 41, 56.1, 56.3, 9; 392/384, 383, 392/385, 399, 410, 411, 420, 421, 424; 132/229, 269, 211, 212, 218, 224, 271; 164/412, 35, 45; 606/1, 101, 104, 28, 606/281, 284, 79, 86; 411/436, 411, 433,
(Continued)

(56) References Cited

U.S. PATENT DOCUMENTS 957,256 A    5/1910  Rice, Jr.
3,393,857 A *  7/1968  Taylor, Jr. .............. B23K 3/026
                                              228/55
(Continued)

FOREIGN PATENT DOCUMENTS

DE         150015 A1    8/1981
DE        3825048 A1    1/1990
(Continued)

*Primary Examiner* — Justin C Dodson
*Assistant Examiner* — William C. Gibson
(74) *Attorney, Agent, or Firm* — Coats & Bennnett, PLLC

(57) ABSTRACT

A soldering tip fastening device includes a soldering device fastener configured for fastening the soldering tip fastening device on a soldering device, and a soldering tip fastener configured to fasten a soldering tip on a soldering device when the soldering tip fastening device is fastened to the soldering device. The soldering tip fastener and the soldering device fastener are associated with opposite ends of the soldering tip fastening device. The soldering tip fastening device has a sleeve with an elastic element, the sleeve being configured such that the elastic element is tensioned during the fastening of the soldering tip on the soldering device by the soldering tip fastening device.

18 Claims, 2 Drawing Sheets

(58) Field of Classification Search
USPC ....... 411/427, 431, 301, 551, 947, 247, 324, 411/552, 81, 924.1, 970
See application file for complete search history.

(56) References Cited

U.S. PATENT DOCUMENTS

| | | | | |
|---|---|---|---|---|
| 3,871,062 | A * | 3/1975 | Adachi | B23K 9/0256 228/102 |
| 4,119,088 | A * | 10/1978 | Sim | B23K 3/022 126/238 |
| 4,699,308 | A | 10/1987 | Wigley et al. | |
| 4,940,178 | A * | 7/1990 | Hombrecher | B23K 3/026 219/238 |
| 6,215,104 | B1 * | 4/2001 | Kurpiela | B23K 3/0369 219/238 |
| 6,536,650 | B1 | 3/2003 | Dunham et al. | |
| 6,805,275 | B1 * | 10/2004 | Kao | B23K 3/022 126/413 |
| 9,168,605 | B2 * | 10/2015 | Miyazaki | B23K 3/026 |
| 2008/0179309 | A1 * | 7/2008 | Markovsky | B23K 3/026 219/229 |
| 2012/0301611 | A1 | 11/2012 | Yoshimura et al. | |
| 2015/0045783 | A1 * | 2/2015 | Edidin | A61B 18/04 606/29 |
| 2016/0325371 | A1 | 11/2016 | Zerweck et al. | |

FOREIGN PATENT DOCUMENTS

| | | |
|---|---|---|
| DE | 202014001956 U1 | 5/2015 |
| EP | 0016893 A1 | 10/1980 |
| JP | 2006263731 A * | 10/2006 |

\* cited by examiner

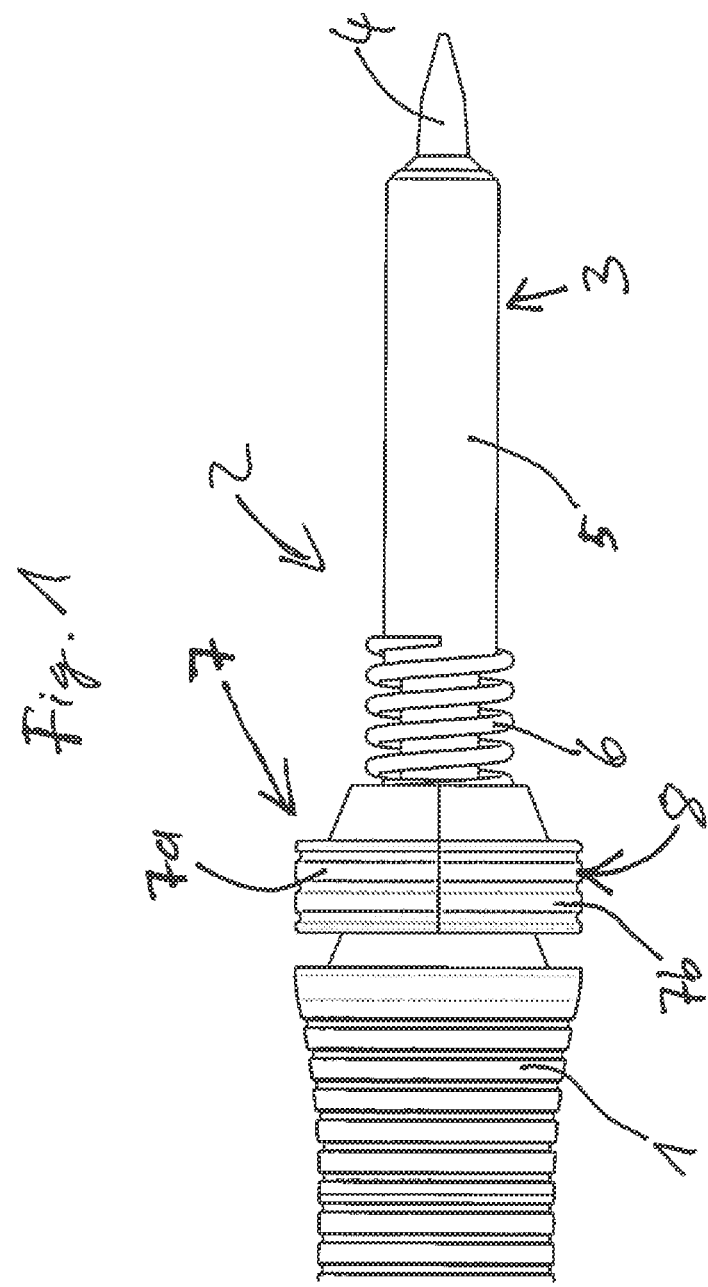

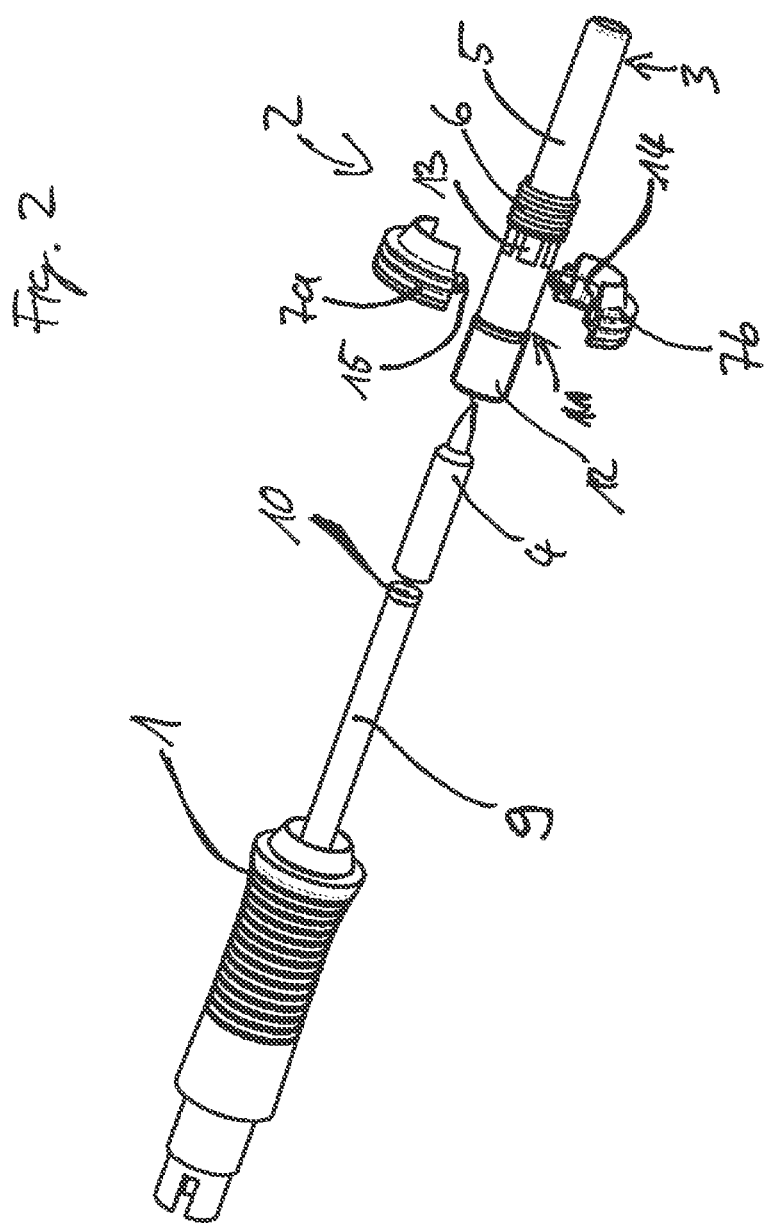

SOLDERING TIP FASTENING DEVICE

This application claims priority to German Application No. DE 202017106517.0, filed 27 Oct. 2017, the disclosure of which is incorporated herein by reference in its entirety.

FIELD OF THE INVENTION

The invention relates to a soldering tip fastening device for securing a soldering tip to a soldering device, and related devices, assemblies, and methods.

BACKGROUND

A soldering tip fastening sleeve connecting a soldering tip to a soldering device by a screw connection is known from DE 20 2014001956U1. It is known from EP 0016893A1 and U.S. Pat. No. 957,256A to use coil springs for the fastening of soldering tips on soldering devices. In U.S. Pat. No. 957,256A, the coil spring primarily serves the purpose of heat isolation. In EP 0016893A1, it is intended to provide for a tight fit of the soldering tip even when the different components thermally expand.

Thus, while one or more approaches to securing a soldering tip to a soldering device are known, they have not proven suitable for all situations. As such, there remains a need for alternative approaches and devices for securing a soldering tip to a soldering device.

SUMMARY

The current disclosure provides an improved soldering tip fastening device. The soldering tip fastening device includes a soldering device fastener configured to fasten the soldering tip fastening device on a soldering device and a soldering tip fastener configured to fasten the soldering tip to the soldering device when the soldering tip fastening device is fastened on the soldering device. The soldering tip fastener and the soldering device fastener are associated with opposite ends of the soldering tip fastening device. The soldering tip fastening device has a sleeve having an elastic element, the sleeve being configured such that the elastic element is tensioned during the fastening of the soldering tip to the soldering device by the soldering tip fastening device.

It is beneficial if the tension of the elastic element is adjustable by the soldering device fastener. In this way, the contact pressure between the soldering tip and the soldering device can be adjusted as required. For example, a lower contact pressure can be selected when using higher soldering temperatures in order to prevent or reduce undesirable expansion stress resulting from thermal expansion.

It is conceivable that the soldering device fastener comprises a thread. This can provide for an adjustability in a particularly easy manner, i.e. by rotating the thread in varying amounts.

The elastic elements and the thread can in particular be inseparably connected with one another, preferably using a positive substance joint, such as a welded connection. This can provide for a quick and easy manufacture and at the same time ensure a particularly secure and heat-resistant connection.

It is especially beneficial if the soldering device fastener has an engagement surface. This can, for example, be a multi-sided surface, in particular a square or a hexagon. This may enable use of widespread and commercially available tools for screwing the soldering device fastener. The elastic element as well as the engagement surface may in particular be inseparably connected to one another, preferably using a positive substance joint, such as a welded connection.

In a further variant, the soldering tip fastening device can further include a shell having a complementary surface being in complementary engagement with the engagement surface of the soldering device fastener. Such a shell may facilitate tool-free mounting of the soldering tip fastening device. Because of the compatibility with the engagement surface of the soldering device fastener provided for by the complementary surface, flexibility of assembly is increased without adding any additional features to the soldering tip fastener.

It is beneficial if the shell has several parts. Thereby, an assembly on the soldering device fastener may be facilitated. For example, two half shells may be put around the engagement surface of the soldering device fastener from opposite sides. The shell may be constructed of more than two parts.

The shell may include an integral hinge. Thereby, individual parts of shells can be connected. In this way, an easy assembly may still be provided without increasing the risk of losing individual parts of shell in the process.

The shell may have a snap connector. The snap connector may serve the purpose of providing for a simple connection between the parts of the shell. A snap connector may be provided on shells with and without integral hinge.

The shell may have a knurled outer circumference. In this way, slipping off may be prevent during the screwing of the soldering device fastener to the soldering device. The knurling may run parallel to an axis of the soldering device fastener or in a circumferential direction of the outer circumference.

The elastic elements may be a coil spring.

The elastic element and the sleeve may be inseparably connected, preferably using a positive substance joint, such as a welded connection.

The disclosure is also directed to a soldering device having a soldering tip fastening device of the kind described above.

In the following, an embodiment of the invention will be explained in more detail with reference to drawings.

BRIEF DESCRIPTION OF THE DRAWINGS

FIG. 1 shows a side view of a soldering tip fastening device, according to one or more embodiments of the invention, assembled to a soldering device.

FIG. 2 shows an exploded perspective view representation of a soldering device as well as of a soldering tip fastening device according to one or more embodiments of the invention.

DETAILED DESCRIPTION

FIG. 1 shows a soldering device 1. A soldering tip fastening device 2 is mounted on the soldering device 1. Due to the mounted state, not all components of the soldering tip fastening device 2 are visible; these will be explained later with reference to FIG. 2. The soldering tip fastening device 2 includes a soldering tip fastener 3. The soldering tip fastener 3 holds a soldering tip 4 at the soldering device 1 in the state shown in FIG. 1. The soldering tip fastening device 2 further includes a sleeve 5 having an elastic element 6. Both may facilitate holding the soldering tip 4. In the variant shown in FIG. 1, a shell 7 is additionally provided. It may comprise two half shells 7a and 7b as in the present embodiment. In the present embodiment, the shell 7 has a knurled outer circumference 8.

In FIG. 2, further parts of the soldering device 1 are visible. The soldering device 1 has a heating element 9. The soldering tip 4 is brought in contact with the heating element 9 in order to heat the soldering tip 4. At the end of the heating element 9 facing the soldering tip 4, a temperature sensor 10 is provided. The temperature sensor 10 may facilitate an open-loop and/or closed-loop temperature control.

FIG. 2 further shows components of the soldering tip fastening device 2 not visible in FIG. 1. A soldering device fastener 11 is visible. The soldering device fastener 11 can have a thread 12, which may be an internal thread or an external thread. Thread 12 may be screwed to a corresponding thread (not shown) on the soldering device 1 in order to connect the soldering tip fastening device 2 with a soldering device 1. The soldering device fastener 11 may have an engagement surface 13. The engagement surface 13 may be adapted for engagement with a tool, for example an open end wrench. The engagement surface 13 may be a multi-sided surface, e.g., square cut or hexagonal. Using a tool for screwing the soldering tip fastening device 2 to the soldering device 1 may serve the purpose of increasing and/or more accurately adjusting the associated tightening torque.

In some embodiments, the thread 12, the engagement surface 13, the elastic element 6, and the sleeve 5 are inseparably connected with one another. Alternatively, each individual connection between these parts may also be provided in a separable manner. Particular preferred variants of inseparable connections are positive substance joints, especially welded connections.

As shown better in FIG. 2, shell 7 may be implemented in a multipart way. The parts of the shell 7 are shown in the form of the first and second half shell 7a,7b, respectively. A complementary surface 14 is visible on the second half shell 7b. The complementary surface may be brought into complementary engagement with the engagement surface 13. A snap connector 15 is shown on the first half shell 7a. The half shells 7a and 7b may be interlocked using such a snap connector 15.

In order to fasten the soldering tip 4 on the soldering device 1, the soldering tip 4 may be put onto the heating element 9. In this state, the soldering tip fastening device 2 may be put over the soldering tip 4 and the heating element 9. For secure fastening, the soldering tip fastening device 2 may be screwed to the soldering device 1 using the thread 12. By attaching the half shells 7a and 7b, a manual assembly is facilitated. By tightening as required, the tension of the elastic element 6 may be adjusted. Thereby, the contact pressure between the soldering tip 4 and the heating element 9 and/or the temperature sensor 10 may be adjusted as well. In the fastened state, the elastic element 6 may prevent an inadmissible increase of the contact pressure, which may be caused by thermal expansion of the components.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A soldering tip fastening device for releasable attachment to a soldering device, the soldering device having a heating element, the soldering tip fastening device comprising:
   a soldering device fastener configured to fasten the soldering tip fastening device on the soldering device;
   a soldering tip fastener comprising a sleeve and an elastic element; the soldering tip fastener configured to releasably fasten a soldering tip on the soldering device by sliding the sleeve longitudinally over both the heating element and the soldering tip, and tightening the soldering device fastener on the soldering device;
   wherein the soldering tip fastener and the soldering device fastener form opposite ends of the soldering tip fastening device, and wherein the soldering device fastener and the sleeve are longitudinally collinear;
   wherein the sleeve and the soldering device fastener are interconnected by the elastic element with the elastic element interposed between and longitudinally separating all of the sleeve from all of the soldering device fastener, the sleeve being configured such that the elastic element is tensioned during the fastening of the soldering tip on the soldering device by the soldering tip fastening device;
   wherein the sleeve is configured to releasably abut the soldering tip to press the soldering tip longitudinally toward the soldering device with the soldering tip releasably held by the sleeve in a fixed position relative to the sleeve and the sleeve peripherally surrounding the heating element of the soldering device.

2. The soldering tip fastening device of claim 1, wherein a tension of the elastic element is adjustable by rotating the soldering device fastener.

3. The soldering tip fastening device of claim 1, wherein the soldering device fastener comprises a thread configured to fasten the soldering tip fastening device on the soldering device.

4. The soldering tip fastening device of claim 3, wherein the elastic element and the thread are connected to one another in an inseparable manner.

5. The soldering tip fastening device of claim 4, wherein the elastic element and the thread are connected to one another in an inseparable manner by a welded connection.

6. The soldering tip fastening device of claim 1, wherein the soldering device fastener has an engagement surface.

7. The soldering tip fastening device of claim 6, wherein the elastic element and the engagement surface are connected to one another in an inseparable manner.

8. The soldering tip fastening device of claim 7, wherein the elastic element and the engagement surface are connected to one another in an inseparable manner by a welded connection.

9. The soldering tip fastening device of claim 1:
   wherein the soldering device fastener comprises an engagement surface disposed longitudinally opposite the sleeve relative to the elastic element;
   wherein the soldering tip fastening device further comprises a shell having a complementary surface which is configured for complementary engagement with the engagement surface of the soldering device fastener, the shell comprising two interlockable half-shells.

10. The soldering tip fastening device of claim 9, wherein the shell includes an integral hinge.

11. The soldering tip fastening device of claim 9, wherein the shell has a snap connector.

12. The soldering tip fastening device of claim 9, wherein the shell has a knurled outer circumference.

13. The soldering tip fastening device of claim 1, wherein the elastic element is a coil spring.

14. The soldering tip fastening device of claim 1, wherein the elastic element and the sleeve are connected to one another in an inseparable manner.

15. The soldering tip fastening device of claim 14, wherein the elastic element and the sleeve are connected to one another in an inseparable manner by a welded connection.

16. A soldering device, comprising:
an axially extending heating element;
a soldering tip fastening device configured to releasably attached to the soldering device; the soldering tip fastening device comprising:
a soldering device fastener configured to fasten the soldering tip fastening device on the soldering device;
a soldering tip fastener comprising a sleeve and an elastic element; the soldering tip fastener configured to releasably fasten a soldering tip on the soldering device by sliding the sleeve longitudinally over both the heating element and the soldering tip, and tightening the soldering device fastener on the soldering device;
wherein the soldering tip fastener and the soldering device fastener form opposite ends of the soldering tip fastening device;
wherein the sleeve and the soldering device fastener are interconnected by the elastic element with the elastic element interposed between and longitudinally separating all of the sleeve from all of the soldering device fastener; the sleeve being configured such that the elastic element is tensioned during the fastening of the soldering tip on the soldering device by the soldering tip fastening device;
wherein the sleeve is configured to releasably abut the soldering tip to press the soldering tip longitudinally toward the soldering device with the soldering tip releasably held by the sleeve in a fixed position relative to the sleeve and the sleeve peripherally surrounding the heating element of the soldering device, with the heating element and the soldering tip being longitudinally collinear.

17. The soldering device of claim 16, wherein a tension of the elastic element is adjustable by rotating the soldering device fastener.

18. The soldering device of claim 16:
wherein the soldering device fastener has an engagement surface disposed longitudinally opposite the sleeve relative to the elastic element;
wherein the soldering tip fastening device further comprises a shell having a complementary surface which is adapted for complementary engagement with the engagement surface of the soldering device fastener, the shell comprising two interlockable half-shells.

* * * * *